US008891116B2

(12) United States Patent
Dorfner

(10) Patent No.: US 8,891,116 B2
(45) Date of Patent: Nov. 18, 2014

(54) METHOD AND APPARATUS FOR REGULATING A PROPERTY OF AN IMAGE PRINTED ON A SUPPORT MATERIAL

(75) Inventor: Ralph Dorfner, Oberding (DE)

(73) Assignee: Océ Printing Systems GmbH, Poing (DE)

( * ) Notice: Subject to any disclaimer, the term of this patent is extended or adjusted under 35 U.S.C. 154(b) by 191 days.

(21) Appl. No.: 13/386,344

(22) PCT Filed: Jul. 22, 2010

(86) PCT No.: PCT/EP2010/060655

§ 371 (c)(1),
(2), (4) Date: Jan. 20, 2012

(87) PCT Pub. No.: WO2011/009921

PCT Pub. Date: Jan. 27, 2011

(65) Prior Publication Data

US 2012/0162676 A1 Jun. 28, 2012

(30) Foreign Application Priority Data

Jul. 22, 2009 (DE) ........................ 10 2009 034 227

(51) Int. Cl.
*G06F 3/12* (2006.01)
*G03G 15/00* (2006.01)

(52) U.S. Cl.
CPC .. *G03G 15/5062* (2013.01); *G03G 2215/00067* (2013.01)
USPC .......................................... 358/1.15; 399/49

(58) Field of Classification Search
CPC ................ G03G 15/5062; G03G 2215/00067
USPC ............................................ 358/1.9; 399/49
See application file for complete search history.

(56) References Cited

U.S. PATENT DOCUMENTS

| | | | |
|---|---|---|---|
| 5,481,337 A | 1/1996 | Tsuchiya et al. | |
| 5,576,811 A | 11/1996 | Kobayashi et al. | |
| 5,722,006 A | 2/1998 | Watanabe | |
| 5,887,223 A | 3/1999 | Sakai et al. | |
| 6,081,677 A | 6/2000 | Maess et al. | |
| 6,449,458 B1 | 9/2002 | Lang et al. | |
| 7,260,334 B2 | 8/2007 | Winter et al. | |
| 2006/0062617 A1 | 3/2006 | Yamasaki | |
| 2006/0251436 A1 * | 11/2006 | Winter et al. | 399/49 |
| 2010/0028032 A1 | 2/2010 | Schwarz-Kock et al. | |

FOREIGN PATENT DOCUMENTS

| | | |
|---|---|---|
| DE | 19509852 A1 | 9/1995 |
| DE | 19827210 C1 | 12/1999 |
| WO | 03012552 A2 | 2/2003 |
| WO | 2008071741 A1 | 6/2008 |

* cited by examiner

*Primary Examiner* — Douglas Tran
*Assistant Examiner* — Justin Katzwhite
(74) *Attorney, Agent, or Firm* — Schiff Harding LLP

(57) ABSTRACT

In a method or device to control at least one property of a print image printed on a substrate, a first evaluation period is defined. A measurement value is determined with aid of an optical sensor which measures at least one determination point on the substrate within the first evaluation period, and also determining a position of the determination point within the first evaluation period. The determined measurement value is compared with a preset reference value. Depending on a result of the comparison, an inking of the substrate is controlled for the print image in at least one subsequent second evaluation period at a point within the second evaluation period which has a position within the second evaluation period that corresponds to said position of the determination point in said first evaluation period.

21 Claims, 4 Drawing Sheets

METHOD AND APPARATUS FOR REGULATING A PROPERTY OF AN IMAGE PRINTED ON A SUPPORT MATERIAL

BACKGROUND

The disclosure concerns a method and a device to regulate a property of a print image printed on a substrate material, in which method and device a measurement value is determined with the aid of an optical sensor. The measurement value is compared with a desired value. The inking of the substrate material is controlled depending on the result of this comparison.

The method and the device can in particular be used to regulate the optical density of the print image in electrographic color printers operating in print periods. In a print period, the individual color separations required for the print image are applied successively and overlapping onto a transfer element with the aid of developer units, and are transferred from the transfer element onto the substrate material after all color separations required for the print image to be generated have been applied onto the transfer element. For this the substrate material (designed in the form of a printing substrate web) must be periodically halted and accelerated again, corresponding to the print period. For example, the toner applied onto the substrate material is fixed onto the substrate material with the aid of a fixing unit operating with radiant heat. In order to prevent damage to the substrate material, cover units—blinds, for example—are driven between the heating elements of the fixing unit and the substrate material as soon as the substrate material is stopped in order to protect the substrate material arranged within the fixing unit from too much thermal radiation during a standstill. If the substrate material is driven again, the cover units are retracted so that the additional print image is fixed on the substrate material. This thus leads to fluctuations of the heat acting on the substrate material in the fixing unit. Due to the high heat sensitivity of the toner, these heat fluctuations produce fluctuations in the optical density and/or the gloss of the print image printed on the substrate material.

From U.S. Pat. No. 6,081,677 A, a method is known to optimize the semitone presentation in electrophotographic printing and copying devices in which a bias potential and/or a toner concentration is varied depending on an integral optical density (determined over the surface) of a raster toner mark on a photoconductor. The bias potential serves to adjust an auxiliary transmission voltage to transfer toner particles onto the photoconductor. What is disadvantageous is that no periodic fluctuations are detected; rather, only a general regulation takes place of the toner quantity to be applied during the collection period. The same toner quantity is applied during the entire collection period.

A method and an arrangement to adjust the dot size of print images generated with the aid of an electrographic printing or copying system are known from the document WO 2008/071741 A1. A measure of the area of a toner mark that is actually inked with toner particles is hereby determined as a real value and is compared with a desired value. Depending on the result of this comparison, an electrical field (BIAS potential) is adjusted to transfer toner particles onto the regions of a latent raster image that are to be inked. It is hereby disadvantageous that again only influencing factors that occur before or at the application of the toner image onto the photoconductor are taken into account.

SUMMARY

It is an object to specify a method and a device to control a property of a print image printed onto a substrate in which periodic fluctuations of this property are compensated.

In a method or device to control at least one property of a print image printed on a substrate, a first evaluation period is defined. A measurement value is determined with aid of an optical sensor which measures at least one determination point on the substrate within the first evaluation period, and also determining a position of the determination point within the first evaluation period. The determined measurement value is compared with a preset reference value. Depending on a result of the comparison, an inking of the substrate is controlled for the print image in at least one subsequent second evaluation period at a point within the second evaluation period which has a position within the second evaluation period that corresponds to said position of the determination point in said first evaluation period.

DESCRIPTION OF PREFERRED EMBODIMENTS

Figure 1:
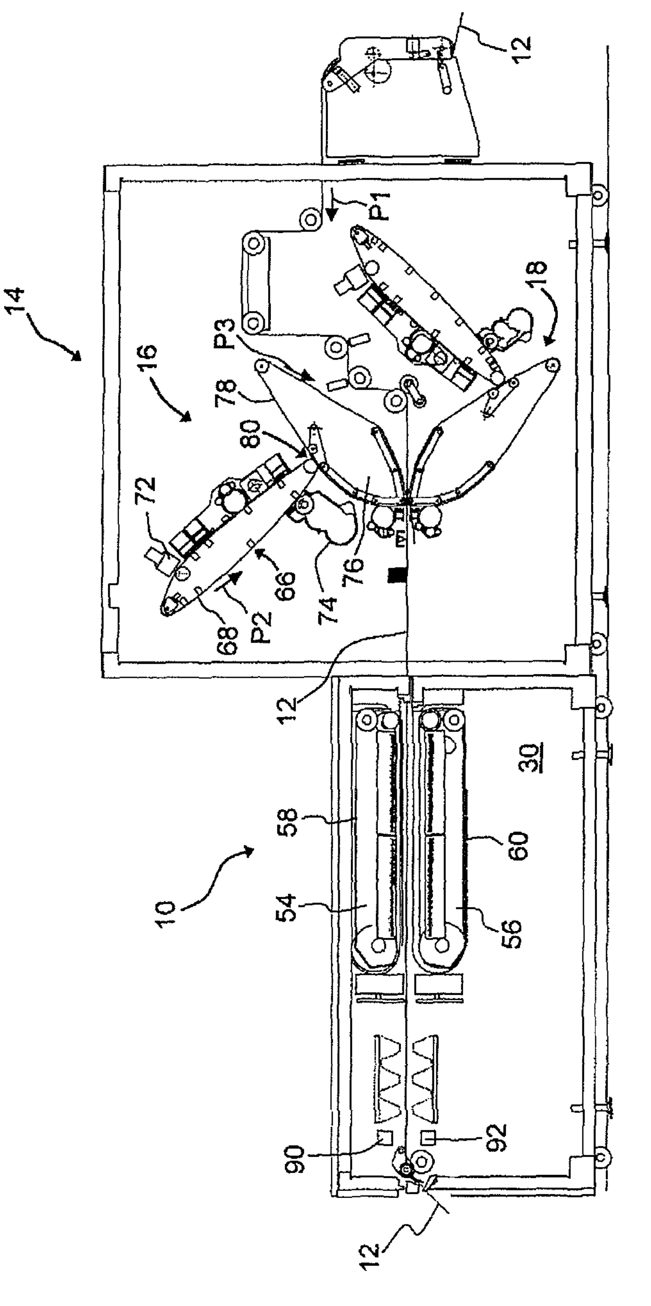
FIG. 1 is a schematic representation of an electrophotographic high-capacity printer system to print a paper web.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

Via the association of the position of the determination point with a measurement value determined at the determination point, the inking of the substrate material can be individually controlled for a point of the at least one subsequent evaluation period that corresponds, within the one subsequent evaluation period, to the position of the determination point within the evaluation period in which the measurement value was determined. In this way, periodic fluctuations of the property to be regulated and registered by the measurement value that respectively occur at the same point of an evaluation period are compensated. For example, such periodic fluctuations arise due to periodic influencing factors, for example the effect of heat due to the fixing unit and/or due to out-of-balances of rollers or drums.

The evaluation period can be designed as an evaluation window with an established length.

The described method is advantageously repeated in each evaluation period. In a printing operating in a printing period, such an evaluation period advantageously corresponds to a printing period, for example a length of five DIN A4 pages that, after collection of the color separations on the transfer element, are transfer-printed jointly from this onto the substrate material.

It is advantageous to offset the determination point from evaluation period to evaluation period. It can thereby be achieved that, after a plurality of evaluation periods, each point of the evaluation period was scanned once within the evaluation period. After the plurality of evaluation periods, a measurement value has then been determined for each point of an evaluation period so that a location-specific control can also take place for each point of an evaluation period.

The precision of the control is increased via the determination of multiple measurement values per evaluation period, in particular via the determination of a spatially dependent curve of the measurement value over the evaluation period. The more measurement values that are determined per evaluation period, the more precisely that periodic influence factors that produce the periodic fluctuation of the property to be regulated can be compensated. In the determination of the spatially-dependent curve of the measurement values, the position of the determination point at which a measurement value was determined is respectively associated with each determined measurement value within the evaluation period. The inking in the one subsequent evaluation period for each point within the evaluation period can thus be controlled individually. The one subsequent evaluation period can, for example, be the evaluation period immediately following the evaluation period in which the measurement values are determined. Alternatively, one or more evaluation periods can lie between the evaluation period in which the measurement values are determined and that evaluation period for which the property of the print image is controlled depending on the determined measurement values.

An electrophotographic high-capacity printing system 10 to print a continuous paper web 12 is shown in FIG. 1. A print engine 14 comprises a first image generation and transfer-printing unit 16 to print the front side of the paper web 12 and a second image generation and transfer-printing unit 18 to print the back side of the paper web 12. The image generation and transfer-printing units 16, 18 are designated as printing units 16, 18 in the following. The printing unit 16 is essentially structurally identical to the printing unit 18.

The paper web 12 is transported through the printing system 10 in the arrow direction of the arrow P1, wherein after printing in the print engine 14 the paper web 12 is supplied to a fixing station 30 in which the print images generated by the print engine 14 on the paper web 12 are fixed. The fixing station 30 contains a first fixing unit 54 and a second fixing unit 56 that are arranged on the opposite sides of the paper web 12, wherein the first fixing unit 54 fixes the toner images on the front side of the paper web and the second fixing unit 56 fixes the toner images on the back side of the paper web 12. The fixing units 54, 56 are executed as radiation fixing units, wherein the fixing units 54, 56 respectively comprise a cover device 58, 60 that covers the radiation of the fixing units 54, 56 during operating states in which a fixing of the toner images on the paper web 12 should not take place. The fixing station 30 also comprises two optical sensors 90, 92 that determine the optical density of the print image printed on the paper web 12 as measurement values after traversing the fixing units 54, 56. The optical sensors 90, 92 are arranged on opposite sides of the paper web 12. The optical density of the print image printed on the front side of the paper web 12 (top side of said paper web 12 in FIG. 1) is determined in a detection region with the first sensor 90; and the optical density of the print image printed on the back side of the paper web 12 (underside in FIG. 1) is determined in a detection region with the second sensor 92. The optical sensors 90, 92 in particular comprise CCD sensors, and advantageously at least one light source.

The function of the print group 14 and the fixing station 30 is described in detail in U.S. Pat. No. 6,505,015 B1 and in U.S. Pat. No. 6,449,458 B1, the contents of which are incorporated by reference into the present Specification and thus are a component of the disclosure of the Application.

The first printing unit 16 comprises a first belt drive 66 with a photoconductor belt 68. The photoconductor belt 68 is driven with aid of the belt drive 66 in the arrow direction of the arrow P2. The photoconductor belt 68 is charged to a predetermined potential. Regions of the uniformly charged surface of the photoconductor belt 68 are discharged partially (in particular at pixels) with the aid of a character generator 72, corresponding to the signals supplied to the character generator 72, and a charge image is thereby generated on the surface of the photoconductor belt 68. The charge image on the surface of the photoconductor belt 68 is inked with toner of a first color into a toner image with aid of a developer unit 74.

The printing unit 16 has a second belt drive 76 with a transfer belt 78 driven in the arrow direction of arrow P3. The photoconductor belt 68 contacts the transfer belt 68 at a transfer printing area 80, meaning that the surface of the photoconductor belt 68 touches the surface of the transfer belt 78, whereby a toner image located on the photoconductor belt 68 is transferred onto the surface of the transfer belt 78.

Given multicolor printing, multiple pages (five pages, for example) are combined into a group that is also designated as a printing sequence. This printing sequence is typically somewhat shorter than the extent of the transfer belt 78. Multiple pages are also combined into a printing sequence given single-color printing. Given multicolor printing, the toner image generated with the toner of the first color is a first color separation. After the generation of the first color separation, given multicolor printing a second color separation with toner of a second color is applied onto the surface of the photoconductor belt 68 as a next step after the generation of the first color separation. The toner image with toner of the second color is subsequently transferred from the photoconductor belt 68 onto the transfer belt 78 at the transfer printing point 80 such that pixels associated with one another thus lie exactly atop one another, and the color separations are thus in register. This described process can be repeated multiple times, advantageously for four color separations with the colors cyan (C), magenta (M), yellow (Y) and black (K). If the last color separation to be generated in the printing period was transferred at least partially onto the transfer belt 78, the transfer belt 78 is pivoted onto the paper web 12, such that the toner image located on the transfer belt 78 is transferred from the transfer belt 78 onto the front side of the paper web 12.

The printing system operates in printing periods, meaning that the paper web 12 is driven in a periodic start and stop operation for multicolor printing since the toner image is only transferred from the transfer belt 78 onto the paper web 12 when all color separations have been applied onto the transfer belt 78. One printing sequence is printed on the paper web 12 per printing period. The generation and collection of the color separations and the transfer-printing from the transfer belt 78 onto the paper web 12 is also designated as a collection period. After the color separations generated in a collection period have been transfer-printed onto the paper web 12, the transfer belts 78 are pivoted away from the paper web 12 again and the drive of the paper web 12 is stopped. The paper web 12 is subsequently retracted so far that the color separations generated in the subsequent collection cycle are transferred together onto the reaccelerated paper web 12. The leading edge of the color separations generated in the second collection period then adjoins the trailing edge of the color separations generated in the first collection period. While the paper web 12 is slowed and stopped, the cover devices 58, 60 are driven between the fixing units 54, 56 and the paper web 12 so that the radiant heat of the fixing units 54, 56 is shielded.

If the paper web 12 is accelerated again from standstill, the print image that is not yet completely fixed at the stop of the paper web 12 and the subsequently unfixed print regions are additionally fixed. For this, the cover devices 58, 60 are moved again such that they are no longer arranged between the paper web 12 and the fixing units 54, 56. Due to the periodic opening and closing of the cover devices 58, 60, periodic fluctuations of the thermal effect due to the fixing units 54, 56 occur on the paper web 12 and the toner printed onto the paper web 12. Since the applied toner is very heat-sensitive, slight fluctuations in the thermal effect already lead to different fixing effects, and in particular to fluctuations in the optical density of the print image printed on the paper web 12. Since the fluctuations of the thermal effects repeat periodically from printing period to printing period, the fluctuations of the optical density are also approximately the same from printing period to printing period. Alternatively or additionally, however, the periodic fluctuations of the optical density are also produced by other factors than the thermal effect due to the fixing station 30.

In addition to the thermal effect due to the fixing station 30, the optical density in particular depends on the layer thickness of the applied toner, and thus on the applied toner quantity. Given a method and a device according to a first aspect of the invention, the optical density is controlled via a variation of the applied toner quantity since this can be adjusted simply, quickly and more precisely than the thermal effect due to the fixing station 30. Additionally or alternatively, the optical density can also be controlled via the thermal effect and/or other factors affecting the optical density.

In order to detect and compensate the periodic fluctuations of the optical density, the optical density is determined with spatial dependency and the toner quantity to be applied to the paper web 12 is adjusted with spatial dependency. For this an evaluation period is established, wherein the evaluation period advantageously has a same frequency as the largest periodic fluctuation of the optical density. The evaluation period thus in particular has the same frequency as the influence factors affecting the largest periodic fluctuation of the optical density. Additionally or alternatively, the evaluation period can be established such that the length of the evaluation period corresponds to the period duration of the largest periodic fluctuation. In the present exemplary embodiment, it is assumed that the periodic fluctuations of the optical density are essentially produced on the paper web 12 by the fluctuations of the thermal effect of the fixing station 30 that repeat periodically from printing period to printing period. In the present exemplary embodiment, the printing period is thus selected as the evaluation period.

In an alternative embodiment of the invention, the evaluation period can also be selected independently of the printing period. In this way, fluctuations of the optical density that have a frequency deviating from the frequency of the printing period can also be compensated. Alternatively, the curve of the optical density can also be determined, and the evaluation period can be determined based on the curve of the determined optical density, for example with the aid of Fourier transformation. In particular, in this way multiple superimposed fluctuations of the optical density can also be determined and compensated via the corresponding adaptation of the toner quantity to be applied.

Figure 2:
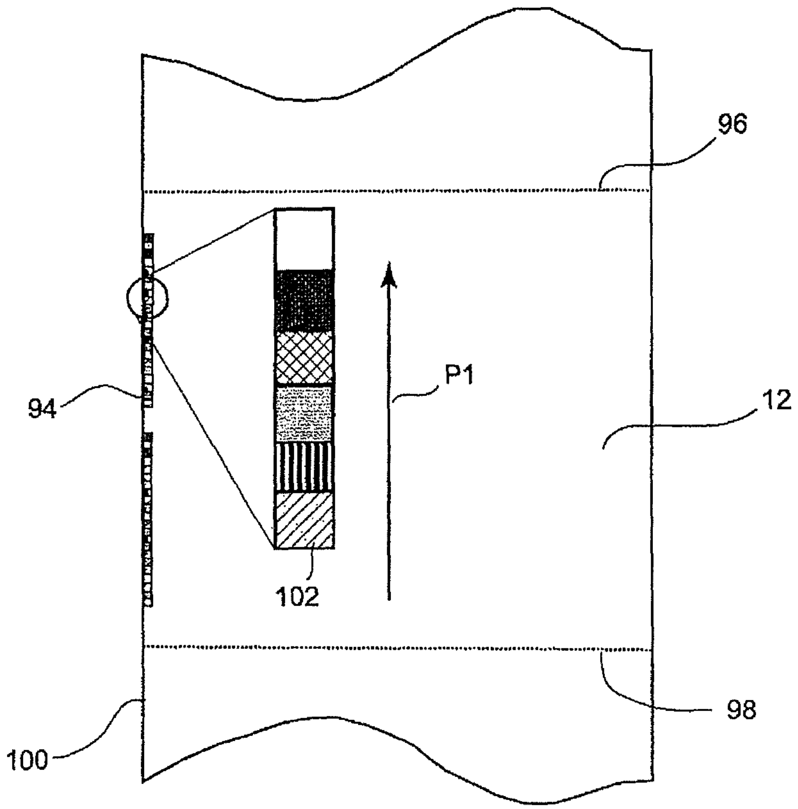
FIG. 2 is a schematic representation of a section of the paper web, with a control stripe printed on the paper web according to a first embodiment of the invention.

To determine the optical density, as is shown in FIG. 2 a control stripe 94 is printed on the paper web 12. Elements with the same design or the same function as in FIG. 1 have the same reference character. The borders of a printing sequence predetermining the printing period are indicated by the two dashed lines 96, 98 running transverse to the transport direction P1.

The control stripe 94 is printed at a border 100 of the paper web 12. The control stripe 94 is in particular positioned such that it is not situated in the print region that is not to be additionally processed of the pages of the printing sequence that are to be printed on the paper web 12. It is thereby assumed that the fluctuations occur only along the paper web 12 (thus in the transport direction P1), and given an inking the optical density is the same transverse to the transport direction P1.

On the other (non-visible) side of the paper web 12 in FIG. 2, a control stripe can likewise be printed on one edge. In the following, for simplification the control of the optical density of the print image is described only for one side of the paper web 12. The control of the optical density of the print image printed on the other side of the paper web 12 takes place analogous to the control described in the following.

The control stripe 94 comprises a plurality of marks, of which one is designated with the reference character 102, for example. The determination point comprising a mark 102 can have different raster tones that range from an un-inked marker to full tone mark. In the exemplary embodiment shown in FIG. 2, six different marks 102 are provided per color so that different marks 102 are printed periodically in the control stripe 94. In particular, marks with an area coverage of 0%, 20%, 60%, 80%, 95% and 100% are used per color. The colors are in particular printed in the order yellow, magenta, cyan, black. In an alternative embodiment, more or fewer than six marks 102 can also be provided per color. Given single-color printing, only marks of this one color are accordingly provided. Also, given single-color printing a continuous stripe with an area coverage of 100% can also be printed.

In particular, the optical densities of full tone marks 102 are determined to control the optical density. At least one full tone mark 102 is respectively printed per color on the paper web 12 per collection period. The optical density of the full tone mark 102 is respectively determined with aid of the optical sensor 90. The position of the full tone mark 102 is also determined within the printing period and stored with the determined density in an evaluation unit (not shown). The position of the full tone mark 102 within the printing period can be determined with the aid of a paper travel sensor or from the print data, for example.

The determined optical density is respectively compared with a preset optical reference density. Depending on the result of the comparison between the determined optical density and the reference optical density, the toner quantity is established that is to be applied on the paper web 12 at a point within a subsequent evaluation period that corresponds to the determined position of the full tone mark 102. In this way the toner quantity to be applied is established specific to a location and the optical density is controlled specific to a location relative to the printing period. The at least one subsequent printing period for which the location-specific toner quantity to be applied is established is, for example, the printing period immediately following the printing period in which the optical densities were determined.

The toner quantity to be applied is established separately, specific to the location, for each color that is used, in the previously described manner with the aid of the full tone mark 102 of the corresponding color. For simplification, in the following the control is described for one color. The control takes place correspondingly for the other colors.

Via the repetition of the previously described method from printing period to printing period, influencing factors on the optical density that change during the operation are taken into account continuously in the establishment of the toner quantity to be applied. A self-optimizing system thus results.

In an alternative embodiment, a spatially dependent curve of the optical density is determined over the printing period. The spatially dependent curve of the optical density is determined separately for the different colors used in the printing of the paper web 12. The more full tone marks 102 that are printed on the paper web 12 per color and printing period, the more values for the optical density that can be determined with the aid of the sensor 90, and the more precise the control of the optical density of the print image. At least one full tone mark 102 is advantageously printed per color and per page of the printing period. In this way the toner quantity to be applied in a subsequent printing period can be established in this way, at least specific to the page.

Figure 3:
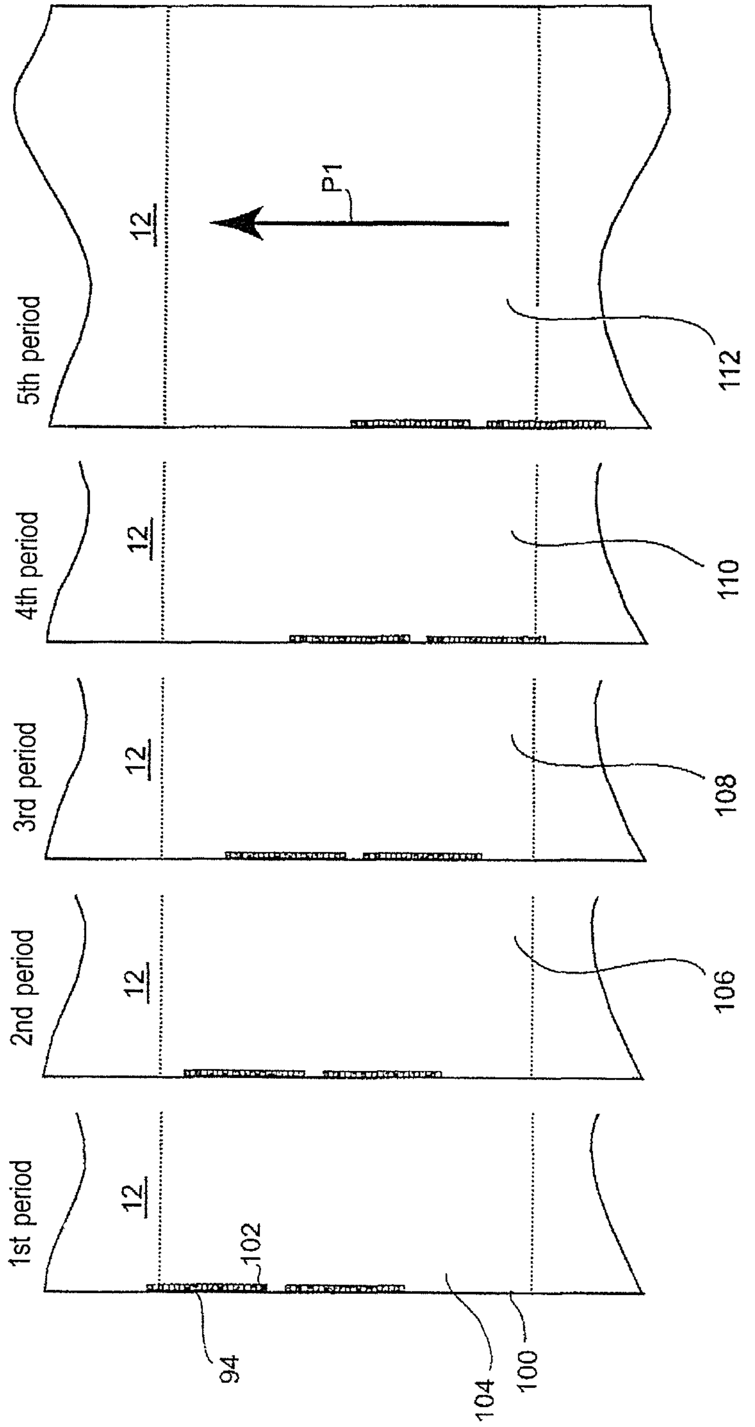
FIG. 3 is a schematic representation of multiple sections of the paper web according to FIG. 2.

As is shown in FIG. 3, the full tone marks 102 are not always positioned at the same position within the printing period in multiple successive printing periods, but rather are systematically offset. In this way it is achieved that a respective full tone mark 102 of a respective color covers each point within the printing period in a finite number of printing periods. In FIG. 3, this is shown as an example for five printing periods 104 through 112. In this way, a full tone mark 102 is printed for each point of the printing period after the finite number of printing periods, and the value of the optical density of this full tone mark 102 is determined so that a location-specific control can also take place for any point of the printing period.

Figure 4:
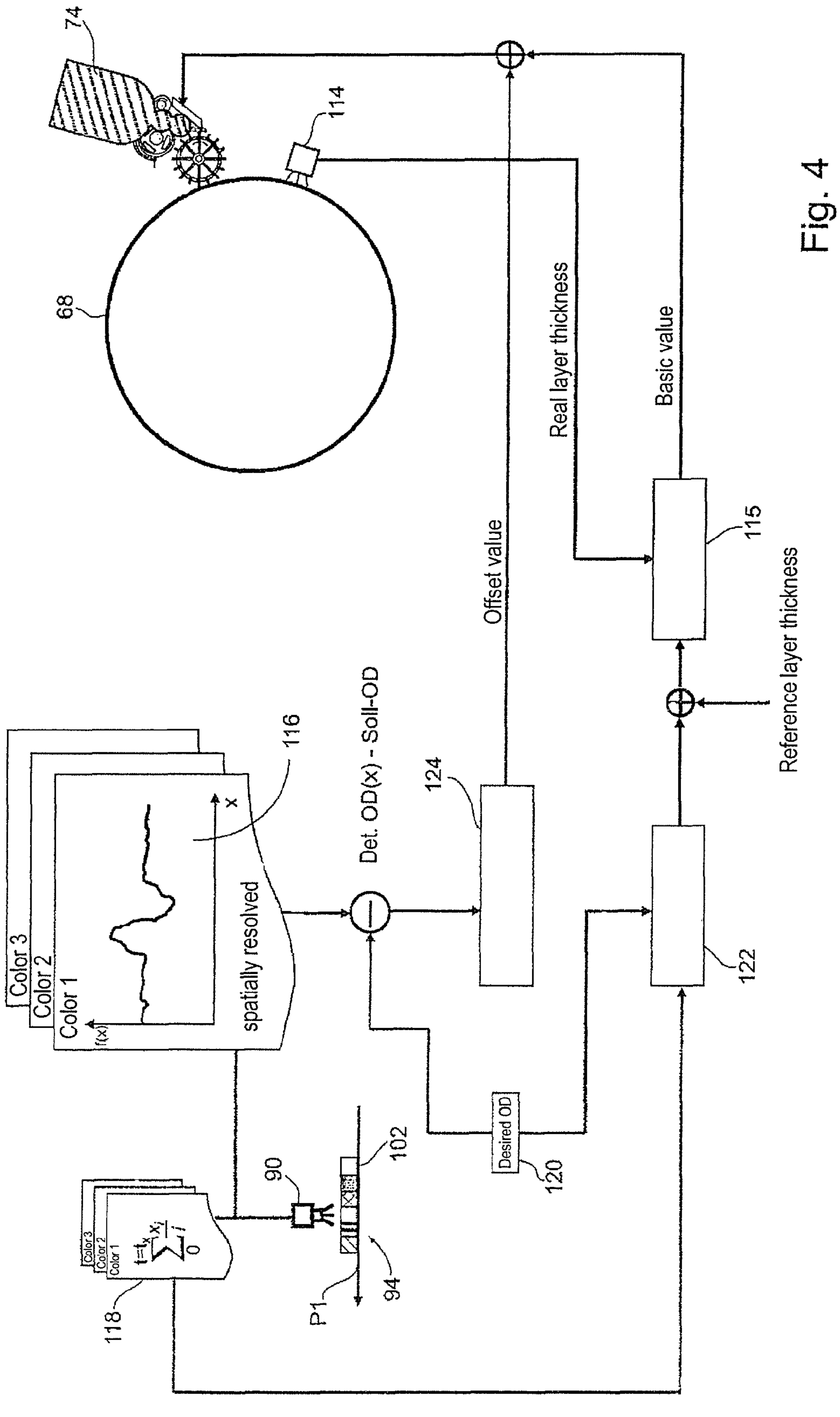
FIG. 4 is a schematic representation of a control of the optical density of the print image printed on the paper web according to a further embodiment of the invention.

A schematic representation of the control of the optical density of the print image printed on the paper web 12 is shown in FIG. 4 according to an additional exemplary embodiment of the invention. In this embodiment, the optical density is regulated across three control loops combined with one another.

The printing unit 16 comprises a layer thickness sensor 114 to determine the thickness of the toner layer applied onto the photoconductor belt 68 at the regions of the charge image that are to be inked. The layer thickness sensor 114 is in particular a known capacitive sensor. With the aid of the layer thickness sensor 114, in a first control loop per printing period at least one real layer thickness of the toner layer applied onto the photoconductor belt 68 is determined and compared with a preset desired layer thickness with the aid of a first PID controller 115. The toner quantity to be applied by the developer unit 74 onto the photoconductor belt 68 in at least one subsequent printing period is established depending on the result of this comparison. If the comparison of the real layer thickness with the desired layer thickness results in that the real layer thickness is less than the desired layer thickness, the toner quantity to be applied is increased in a subsequent printing period. In contrast to this, if the real layer thickness is greater than the desired layer thickness, the toner quantity to be applied is reduced. The one following printing period can be both the printing cycle directly following the printing period in which the real layer thickness was determined and a later printing period. The value of the toner quantity to be applied in a subsequent printing period that is established in this way merely represents a basic value that is constant across the entire following printing period. The basic value indicates an average level for the toner quantity to be applied, at which level the optical density of the print image fluctuates within a reasonably acceptable range. Long-term changes to the average optical density—for example due to aging of consumables—are hereby compensated. A location-specific establishment of the toner quantity, and thus a spatially dependent compensation of periodic fluctuations of the optical density, does not take place via this first control loop.

The reference layer thickness is not a fixed, preset value, but rather is established in a second control loop. For this, with the aid of the optical sensor 90 the optical density of the full tone mark 102 printed on the paper web 12 within the printing period is determined. The determined optical densities are stored in an evaluation unit (not shown) together with the respective position of the full tone mark 102 for which the respective optical density was determined. A spatially dependent curve 116 of the optical density across a printing period thus results.

After the spatially dependent curve 116 of the optical density across a printing period was determined, a mean value 118 of the optical density (in particular the arithmetic mean or the median of all optical densities determined during the printing cycle) is determined. This mean value 118 is compared with the aid of a second PID controller 122 with a preset desired optical density 120. Depending on the result of this comparison, the reference layer thickness is established and is transmitted to the first PID controller 115 for the comparison with the real layer thickness determined in a subsequent printing period.

If the comparison of the mean value 118 of the determined optical density with the preset reference optical density 120 results in that the mean value 118 is lower than the reference optical density 120, the desired layer thickness is increased. Conversely, the reference layer thickness is reduced when the comparison results in that the mean value 118 of the determined optical density is greater than the desired optical density 120. Due to the variation of the reference layer thickness 120, the toner quantity to be applied in the one subsequent printing period is varied correspondingly via the comparison of the real layer thickness (determined with the aid of the layer thickness sensor 114) with the reference layer thickness 120, such that the mean value 118 of the optical density determined during the one subsequent printing period approximates the reference optical density 120.

Alternatively, the mean value calculation of the determined optical density can also take place across more than one printing period, in particular across three printing periods. By calculating the mean value, periodic fluctuations of the optical density are not taken into account since information about the position of the full tone marker 102 within the printing period, and thus the information about the fluctuations of the optical density due to the mean calculation is lost.

In order to compensate for the periodic fluctuations of the optical density during the printing period, a location-specific control of the optical density takes place in a third control loop. For this the optical density determined for each full tone mark 102 is respectively compared with the desired optical density 120 with the aid of a third PID controller 124. A spatially dependent correction value is established depending on the comparison between the determined optical density and the reference density. The toner quantity to be applied onto the paper web 12 at the point that corresponds to the position of the full tone mark 102 for which the respective optical density was determined within the one subsequent period is set as a sum of the basic value of the toner quantity to be applied (established with the aid of the first and second control loop) and the correction value. The correction value can thereby be positive or negative. A location-specific control of the optical density results in this way, such that periodic fluctuations of the optical density results so that periodic fluctuations of the optical density are compensated. The more full tone marks 102 that are provided per printing period, and accordingly the more values that are determined for the optical density, the more precise the control of the optical density.

The previously described control of the optical density with the aid of the three control loops takes place separately for the employed colors in multicolor printing. Instead of PID controllers 115, 122, 124, other controllers can also be used.

In an alternative embodiment of the invention, the curve of the optical density can be determined over multiple evaluation periods, and for each point of the evaluation period a location-specific mean value of the optical density at this point can be determined over all or a portion of the evaluation periods. In particular, an average curve of the optical density is determined over an averaged evaluation period. One-time fluctuations of the optical density at one point are hereby compensated via the mean calculation, whereby erratic changes of the toner quantity are prevented. Alternatively, instead of the spatially dependent curve of the optical density a spatially dependent curve of the correction values can also be determined.

The described methods to regulate the optical density can be used both in image generation processes to print the paper web 12 with dry toner and with liquid toner. With the aid of the described methods, the optical density can also be used in printing systems and copiers operating with ink.

In an alternative embodiment, the optical density can also be controlled via other influencing factors affecting the inking of the print image (the print data, for example). As an alternative or in addition to the optical density, other properties of the print image printed on the paper web 12 can also be controlled with the aid of the method according to the invention or the device according to the invention. Measurement values of other optically determinable variables than the optical density can also be similarly determined with the aid of the optical sensor 90, 92.

The method can also be used not only to control the optical density but also to control other parameters characterizing the quality of a print image, for example the glossiness, the area coverage and/or the color values. The gloss is in particular determined via a degree of gloss. The degree of gloss is a measure of the gloss of the print image. For example, the degree of gloss can be determined with the aid of the optical sensors 90, 92. A manual sensor to determine the degree of gloss is known under the designation "micro-TRI-gloss p" from the company BYK Additives & Instruments. For example, the color value can be determined with the aid of the optical sensors 90, 92, which comprise an RGB CCD element and/or a sensor arrangement with a sequential RGB light source that generates red, green and blue light in sequence, and a CCD element that respectively detects at least one image in each color. The color value in particular indicates the proportion of the inked area of the full tone mark 102 relative to the total area of the full tone mark 102. Alternatively, the color value can also be determined via a spectral measurement, for example with the aid of a spectral photometer. In particular, a spectral photometer is used in which the spectral decomposition of the light takes place with the aid of at least one grid.

The optical density is in particular regulated via the toner quantity to be applied; the gloss is regulated via the heat quantity acting on the toner image for fixing; the contact pressure in a thermal pressure fixing and/or fixing oil quantity are controlled via the area coverage, an auxiliary transmission voltage for inking the toner image and/or a variation of the print data.

The amount of heat to be introduced can, for example, be varied via the temperature of the heating elements of the fixing station. The amount of heat to be introduced can additionally or alternatively be varied over the active duration of the thermal radiation radiated onto the substrate material by the fixing unit.

Starting from the core idea to associate the position of the respective determination point 102 with the determined measurement value, it is advantageous to determine a spatially independent basic value with the toner quantity to be applied in the one subsequent evaluation period. An average level for the toner quantity to be applied is hereby established in which the property of the print image that is to be regulated fluctuates in an acceptable range. Long-term variations of the property to be controlled can be compensated by changing the basic value depending on a mean value of all measurement values determined within the evaluation period.

Furthermore, it is advantageous to determine a spatially dependent correction value. By determining the respective toner quantity to be applied as a sum of the spatially independent basic value and spatially dependent correction value, the advantages of a regulation of the property based on a mean value are combined with the advantages of a spatially dependent regulation.

The measurement value is advantageously determined after the toner has been fixed onto the substrate material 12. Periodic influencing factors that affect the property to be controlled during the fixing are thus also accounted for in the regulation. Fluctuations of the thermal effect in the fixing onto the substrate material 12 can especially be compensated.

In a preferred exemplary embodiment of the invention, the optical density of at least two colors is determined at least one respective determination mark 102 of a print image applied onto the substrate material 12 within the established evaluation period. The determined optical density is respectively compared with a preset reference density 120. The position of the determination mark 102 within the evaluation period is respectively associated with the measurement values. Depending on the result of the comparison between the determined optical density and the reference optical density 120, the toner quantity of the respective color that is to be applied onto the substrate material 12 at the point that corresponds to the determined position of the determination mark 102 within the one subsequent evaluation period is established. Given color printers or copiers, the optical density of each color that is used is hereby regulated individually, independently of one another, so that an optimal optical density is achieved for each color. The value of the reference optical density 120 can be preset to be the same for all colors or can be different, specific to the color.

The full tone marks 102 are in particular offset from evaluation period to evaluation period such that a continuous stripe results after a plurality of evaluation periods when these evaluation periods overlap. The full tone marks 102 can hereby overlap or adjoin flush with one another.

It is also advantageous if, for each determination mark 102, a region of the at least one subsequent evaluation period for which the inking is controlled depending on the measurement value determined at this determination mark 102. The region can correspond to the determination mark 102 within the one subsequent evaluation period, or a multiple or a fraction of the determination mark 102.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method to control at least one property of a print image printed on a substrate, comprising the steps of:

defining a first evaluation period dependent upon a periodic fluctuation of said property;

determining a measurement value with aid of an optical sensor which measures said property at least one determination point on the substrate within the first evaluation period, and also determining a position of the at least one determination point within the first evaluation period so that the property measurement value is determined with spatial dependency, said at least one determination point on the substrate within the first evaluation period comprising a printed image mark having a tone value;

comparing the determined measurement value with a preset reference value; and depending on a result of the comparison between the determined measurement value and the reference value controlling an inking of the substrate for said print image to control said property in at least one subsequent second evaluation period at a point within the second evaluation period which has a position within said second evaluation period that corresponds to said position of the at least one determination point in said first evaluation period.

2. The method of claim 1 wherein said printed image mark is one of a plurality of marks of different tone value of a stripe within the first evaluation period.

3. The method of claim 2 wherein at least two of said stripes are provided in said first evaluation period.

4. The method according to claim 1 in which said mark has a preset area coverage printed on the substrate at said position.

5. The method according to claim 1 in which the mark is used to measure optical density, a degree of gloss, a color value or a ratio of inked surface to total surface of the mark as said measurement value.

6. The method of claim 1 wherein another determination point is also provided within said second evaluation period on said substrate, and a position of said another determination point within the second evaluation period corresponds to said position of said determination point within the first evaluation period.

7. The method of claim 1 wherein another determination point is provided in said second evaluation period, and a position of said another determination point in said second evaluation period is different than said position of said determination point in said first evaluation period.

8. The method according to claim 1 in which:

a measurement value is respectively determined at each of at least two determination points on the substrate in the first evaluation period, a position of the respective determination point within the first evaluation period is associated with a measurement value for each respective determination point, each determined measurement value is compared with a respective preset reference value, and depending on a result of a comparison between the respective determined measurement value and the respective reference value, inking of the substrate material is respectively controlled within the subsequent second evaluation period at each respective point whose respective position corresponds to the respective position of each of the respective determination points in the first evaluation period.

9. The method according to claim 8 in which:

an average value of all measurement values determined within the first evaluation period is determined;

the average value is compared with the reference value; and a value of a layer thickness of toner in said at least one subsequent second evaluation period is established depending on said comparison.

10. The method according to claim 8 in which:

a spatially dependent correction value is respectively determined for each determination point depending on a result of the comparison of the respective determined measurement values and the reference value; and within the at least one subsequent second evaluation period, toner quantity that is to be applied at the point that corresponds to the respective position of the respective determination point within the one subsequent second evaluation period is respectively determined as a sum of a basic value and a spatially dependent correction value.

11. The method according to claim 8 in which a curve of the measurement values is determined, and in which the first and second evaluation periods are established depending on said curve.

12. The method according to claim 1 in which a plurality of determination points are provided in the first evaluation period and a spatially dependent curve of respective measurement values for those respective determination points within the first evaluation period is determined.

13. The method according claim 1 in which the first and the second evaluation periods are established depending on a periodically active influencing factor.

14. The method according to claim 1 in which:

layer thickness of toner of a toner image to be printed on the substrate by use of said determination point is determined;

the determined layer thickness is compared with a preset reference layer thickness; and depending on a result of said comparison, a spatially independent basic value of toner quantity to be applied in the at least one subsequent second evaluation period is established.

15. The method according to claim 1 in which the substrate material is printed in printing periods, and in which one such printing period is established as said evaluation period.

16. The method according to claim 1 in which the measurement value is determined after toner has been fixed on the substrate.

17. The method according to claim 1 in which the inking of the substrate is controlled with aid of at least one of toner quantity to be applied and print data used to generate said print image with said inking.

18. The method according to claim 1 wherein additional respective determination points are provided in respective additional evaluation periods after said first evaluation period including said second evaluation period, the respective determination point being at a respective different position within the respective subsequent evaluation periods compared to a position of the determination point in the first evaluation period, wherein said determination points each comprise a printed image mark, said first evaluation period and all subsequent evaluation periods all having a same length and a same number of points, and said marks taken together covering all of said points, and inking of the substrate in each subsequent evaluation period taking place at a respective point in the respective evaluation period corresponding to a position of the associated respective determination point in an associated prior evaluation period.

19. A device to control at least one property of a print image printed on a substrate, comprising:

a first evaluation period dependent upon a periodic fluctuation of said property;

an optical sensor which determines a measurement value by measuring said property at least one determination point on the substrate within the first evaluation period, said determination point having a position within said first evaluation period so that the property measurement value is determined with spatial dependency, said at least one determination point on the substrate within the first evaluation period comprising a printed image mark having a tone value;

a comparison unit for comparing the determined measurement value with a preset reference value; and a control unit which, depending on a result of the comparison between the determined measurement value and the reference value, controls an inking of the substrate for said print image to control said property in at least one subsequent second evaluation period at a point within the second evaluation period which has a position within said second evaluation period that corresponds to said position of the determination point in said first evaluation period.

20. A method to control at least one property of a print image printed on a substrate, comprising the steps of:

defining a first evaluation period dependent upon a periodic fluctuation of said property;

determining a measurement value with aid of an optical sensor which measures said property at least one determination point on the substrate within the first evaluation period, and also determining a position of the at least one determination point within the first evaluation period so that the property measurement value is determined with spatial dependency, said at least one determination point on the substrate within the first evaluation period comprising a printed image mark having a tone value;

determining a measurement value with aid of said optical sensor which measures at least another determination point on the substrate within a subsequent second evaluation period, and also determining a position of the at least another determination point within the second evaluation period, and wherein a position of said another determination point in said second evaluation period is different than said position of said determination point in said first evaluation period;

comparing the determined measurement values with a preset reference value; and depending on a result of the comparison between the determined measurement values and the reference value, controlling an inking of the substrate for said print image to control said property in said subsequent second evaluation period at a point within the second evaluation period which has a position within said second evaluation period that corresponds to said position of the at least one determination point in said first evaluation period, and also controlling an inking of the substrate for said print image in a subsequent third evaluation period following said second evaluation period at a point within the third evaluation period which has a position within said third evaluation period that corresponds to said position of the at least another determination point in said second evaluation period.

21. A device to control at least one property of a print image printed on a substrate, comprising:

first, second, and third evaluation periods dependent upon a periodic fluctuation of said property;

an optical sensor which determines a respective measurement value by measuring said property at least a first determination point on the substrate within the first evaluation period so that the property measurement value is determined with spatial dependency, and also determining a respective measurement value by measuring said property at a second determination point on the substrate within the second evaluation period, said first determination point having a position within said first evaluation period so that the property is determined with spatial dependency and said second determination point having a position within said second evaluation period which is different than said corresponding position of said first determination point within said first evaluation period said first and second determination points on the substrate within the respective first and second evaluation periods comprising a respective printed image mark having a respective tone value;

a comparison unit for comparing the determined measurement values with a preset reference value; and a control unit which, depending on a result of the comparison between the respective determined measurement values and the reference value, controls an inking of the substrate for said print image in said second evaluation period to control said property at a point within the second evaluation period which has a position within said second evaluation period that corresponds to said position of the first determination point in said first evaluation period, and which also controls an inking of the substrate for said print image in said third evaluation period at a point within the third evaluation period which has a position within the third evaluation period that corresponds to said position of said second determination point in said second evaluation period.

* * * * *